United States Patent
Morita et al.

(10) Patent No.: US 8,519,295 B2
(45) Date of Patent: Aug. 27, 2013

(54) CONTROLLER OF ELECTRICAL DISCHARGE MACHINE

(75) Inventors: Kazunari Morita, Chiyoda-ku (JP); Hiroki Hikosaka, Chiyoda-ku (JP); Yasuo Onodera, Chiyoda-ku (JP); Hidetaka Katougi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/638,410

(22) PCT Filed: Dec. 2, 2011

(86) PCT No.: PCT/JP2011/077971
§ 371 (c)(1),
(2), (4) Date: Sep. 28, 2012

(87) PCT Pub. No.: WO2013/080384
PCT Pub. Date: Jun. 6, 2013

(65) Prior Publication Data
US 2013/0140276 A1    Jun. 6, 2013

(51) Int. Cl.
*B23H 1/02* (2006.01)
*B23H 7/20* (2006.01)

(52) U.S. Cl.
USPC ........................................ 219/69.13; 700/162

(58) Field of Classification Search
USPC .......... 219/69.12, 69.13, 69.16, 69.17, 69.18; 700/162
See application file for complete search history.

(56) References Cited

U.S. PATENT DOCUMENTS

| | | | |
|---|---|---|---|
| 4,892,989 A | 1/1990 | Itoh | |
| 5,231,257 A | 7/1993 | Sasaki | |
| 5,496,984 A | 3/1996 | Goto et al. | |
| 5,637,410 A * | 6/1997 | Bonner et al. | ................ 428/516 |
| 2008/0203068 A1 | 8/2008 | Ukai et al. | |

FOREIGN PATENT DOCUMENTS

| | | | |
|---|---|---|---|
| JP | 47-13795 A | | 7/1975 |
| JP | 59-205233 A | | 11/1984 |
| JP | 2-65926 A | | 3/1990 |
| JP | 3-35930 A | * | 2/1991 |
| JP | 3-35933 A | * | 2/1991 |
| JP | 3-35934 A | * | 2/1991 |
| JP | 4-183525 A | | 6/1992 |
| JP | 5-293714 A | | 11/1993 |
| JP | 8-25148 A | * | 1/1996 |
| JP | 9-11043 A | | 1/1997 |
| JP | 2002-154014 A | | 5/2002 |
| WO | 2008/047451 A1 | | 4/2008 |
| WO | 2008/047452 A1 | | 4/2008 |

* cited by examiner

*Primary Examiner* — Geoffrey S Evans
(74) *Attorney, Agent, or Firm* — Sughrue Mion, PLLC

(57) ABSTRACT

A controller of an electrical discharge machine comprises: a control unit that controls a machining condition set by the electrical discharge machine; an acquisition unit that acquires a parameter indicating an electrical discharge state between poles in a state where the machining condition is controlled by the control unit so that a normal electrical discharge occurs between the poles; an arithmetic unit that obtains a probability density distribution of the acquired parameter; a decision unit that decides a threshold that specifies a boundary between a normal electrical discharge and an abnormal electrical discharge between the poles based on the obtained probability density distribution; and a discrimination unit that discriminates whether the electrical discharge state between the poles is normal or abnormal by using the decided threshold, and wherein the control unit controls the machining condition based on a discrimination result of the discrimination unit.

7 Claims, 10 Drawing Sheets

INTEGRATED VOLTAGE [V]

CONTROLLER OF ELECTRICAL DISCHARGE MACHINE

CROSS REFERENCE TO RELATED APPLICATIONS

This application is a National Stage of International Application No. PCT/JP2011/077971 filed on Dec. 2, 2011, the contents of all of which are incorporated herein by reference in their entirety.

TECHNICAL FIELD

The present invention relates to a controller of an electrical discharge machine.

BACKGROUND ART

Conventionally, there is a technique of determining an electrical discharge state between poles of an electrode of an electrical discharge machine and a workpiece, thereby controlling the electrical discharge machine by using the determination result.

Patent Literature 1 describes that an electrical discharge is generated between poles in an electrical discharge machine to detect the gradient of a discharge voltage change, the discharge level, and high-frequency components, and an electrical discharge state is determined by combining two or more kinds of detection signals thereof. According to Patent Literature 1, accurate detection and observation can be performed and optimum control of respective units can be performed.

Patent Literature 2 describes that an electrical discharge is generated between poles in an electrical discharge machine, a high-pass filter extracts only high-frequency components of a voltage waveform between the poles, a rectifier rectifies the high-frequency components, an integrating device integrates rectified outputs, a comparing device compares an integrated voltage with a reference voltage, and a machining condition control device checks an output of the comparing device and extends a quiescent period when discriminating that the electrical discharge state is poor. According to Patent Literature 2, detection of an electrical discharge machining state can be performed accurately, and generation of a continuum arc between the poles can be prevented, thereby enabling to prevent damages on an electrode or a workpiece.

CITATION LIST

Patent Literature

Patent Literature 1: Japanese Patent Application Laid-open No. S47-13795
Patent Literature 2: Japanese Patent Application Laid-open No. H5-293714

DISCLOSURE OF INVENTION

Problem to be Solved by the Invention

In a controller of an electrical discharge machine, generally, an operator inputs a value measured by a measuring instrument to a read control device before shipment of the electrical discharge machine, thereby setting a reference voltage (a threshold) for discriminating the electrical discharge state between poles to a preset certain value.

However, if a threshold is set by the same method after shipment of the electrical discharge machine, read values vary depending on an operator, and the threshold to be set may deviate from an appropriate value. Accordingly, it is likely to become difficult to accurately discriminate whether the electrical discharge state between the poles is normal or abnormal.

Furthermore, as a result of intensive studies, the present inventor(s) has found that, when a workpiece is actually machined by an electrical discharge machine, a high-frequency component in a voltage change between the poles corresponding to the electrical discharge state between the poles may change due to a factor that is hardly assumed before shipment, such as a machining shape and the progress of machining by the electrical discharge machine. Therefore, it is considered that if a threshold is kept to be a certain value preset before shipment, the threshold is likely to deviate from an appropriate value according to the machining shape and the progress of machining, thereby making it difficult to accurately discriminate whether the electrical discharge state between the poles is normal or abnormal.

Furthermore, when the threshold for discriminating the electrical discharge state between the poles is determined before shipment of the electrical discharge machine, it is a common procedure to determine the threshold based on an integrated voltage acquired by setting the electrical discharge state between the poles to a state including many abnormal electrical discharges.

However, when a workpiece is actually machined by the electrical discharge machine after shipment of the electrical discharge machine, if the electrical discharge state between the poles is set to a state including many abnormal electrical discharges, machining of the workpiece is likely to fail, and the workpiece may become useless as a product.

The present invention has been achieved to solve the above problems, and an object of the present invention is to provide a controller of an electrical discharge machine that can accurately discriminate an electrical discharge state between poles, while actually machining the workpiece by the electrical discharge machine.

Means for Solving the Problem

To solve the problem and to achieve the above object, there is provided a controller of an electrical discharge machine for controlling an electrical discharge machine that generates an electrical discharge between poles of an electrode and a workpiece, comprising: a control unit that controls a machining condition set by the electrical discharge machine; an acquisition unit that acquires a parameter indicating an electrical discharge state between the poles in a state where the machining condition is controlled by the control unit so that a normal electrical discharge occurs between the poles; an arithmetic unit that obtains a probability density distribution of the acquired parameter; a decision unit that decides a threshold that specifies a boundary between a normal electrical discharge and an abnormal electrical discharge between the poles based on the obtained probability density distribution; and a discrimination unit that discriminates whether the electrical discharge state between the poles is normal or abnormal by using the decided threshold, and wherein the control unit controls the machining condition set by the electrical discharge machine based on a discrimination result of the discrimination unit.

Effect of the Invention

According to the present invention, a threshold that specifies a boundary between a normal electrical discharge and an abnormal electrical discharge can be decided without using the probability density distribution at the time of the abnormal electrical discharge. Therefore, the electrical discharge state between poles can be accurately discriminated, while performing actual machining of a workpiece by an electrical discharge machine.

EMBODIMENT(S) FOR CARRYING OUT THE INVENTION

Exemplary embodiments of a controller of an electrical discharge machine according to the present invention will be explained below in detail with reference to the accompanying drawings. The present invention is not limited to the embodiments.

First Embodiment

Figure 1:
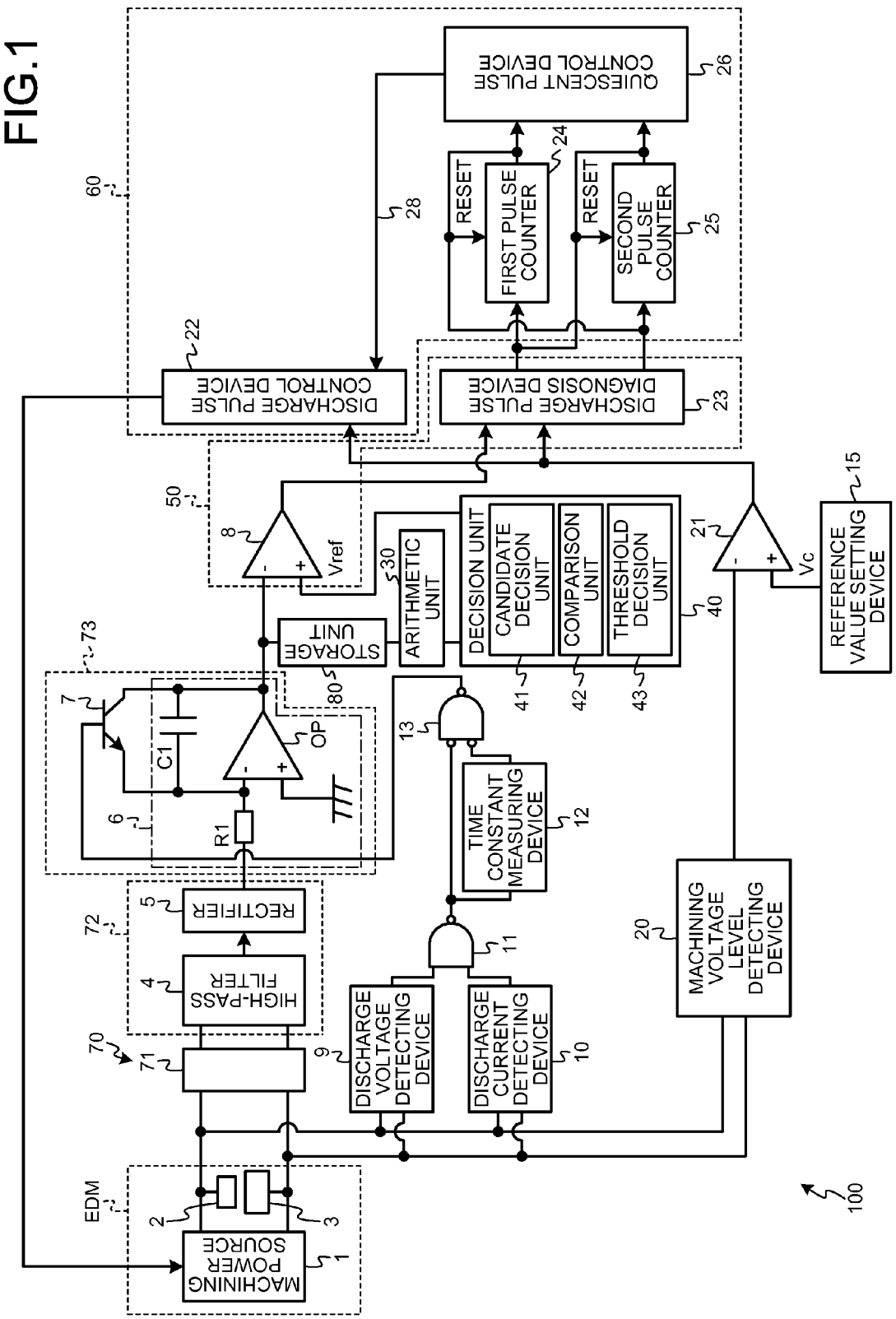
FIG. 1 depicts a configuration of a controller of an electrical discharge machine according to a first embodiment.

A controller 100 of an electrical discharge machine EDM according to a first embodiment is explained with reference to FIG. 1. FIG. 1 depicts a configuration of the controller 100 of the electrical discharge machine EDM.

The controller 100 controls an operation of the electrical discharge machine EDM. For example, in the electrical discharge machine EDM, a machining power source 1 applies a machining voltage between poles of a machining electrode 2 and a workpiece 3 to generate a pulse discharge between the poles, thereby performing machining of the workpiece 3. The controller 100 has the following configurations.

An acquisition unit 70 acquires a parameter (that is, a normal discharge parameter) indicating an electrical discharge state between poles in a state where machining conditions are controlled by a control unit 60 so that a normal electrical discharge occurs between the poles. Specifically, the acquisition unit 70 includes a voltage detection unit 71, an extraction unit 72, and an integration unit 73.

Figure 2A:
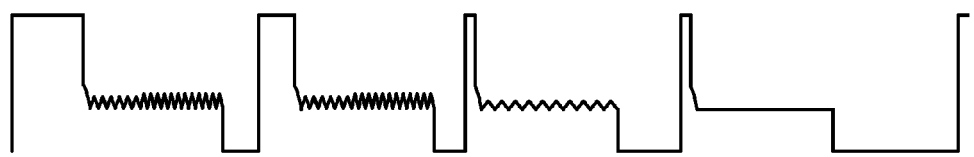
FIGS. 2A to 2E depict operations of the controller of the electrical discharge machine according to the first embodiment.

The voltage detection unit 71 detects a discharge voltage between the poles (see FIG. 2A. For example, the voltage detection unit 71 receives a differential signal from opposite ends between the poles by two input terminals and outputs a differential signal (for example, a differential voltage) corresponding to the input differential signal from two output terminals as a detected discharge voltage. The voltage detection unit 71 can be, for example, a unit in which an impedance element is connected between two parallel lines or a unit simply having two parallel lines. The voltage detection unit 71 supplies a detected discharge voltage to the extraction unit 72.

Figure 2B:
Figure 2C:
Figure 2D:

The extraction unit 72 extracts high-frequency components of the detected discharge voltage. The extraction unit 72 includes a high-pass filter 4 and a rectifier 5. The high-pass filter 4 extracts high-frequency components (see FIG. 2B) superimposed on the discharge voltage when a machining discharge is generated between the poles. The rectifier 5 rectifies the high-frequency components extracted by the high-pass filter 4 (see FIG. 2C), performs smoothing (see FIG. 2D), and supplies the smoothed high-frequency components to the integration unit 73.

Figure 2E:
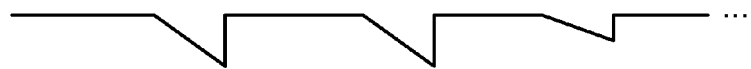
Figure 4A:
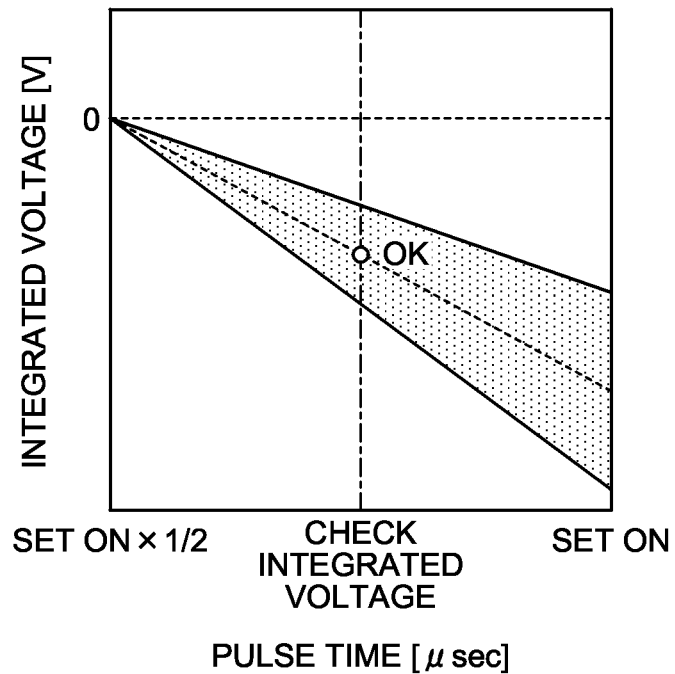
FIGS. 4A and 4B are diagrams for explaining an operation of an arithmetic unit according to the first embodiment.

The integration unit 73 integrates high-frequency components of the extracted discharge voltage and outputs an integrated voltage as a parameter indicating the electrical discharge state between the poles (see FIG. 2E and FIG. 4A). The integration unit 73 includes an integrating circuit 6 and a reset transistor 7. The integrating circuit 6 includes an operating amplifier OP, a resistor R1, and a capacitor C1. The reset transistor 7 becomes an ON state when an output level of an AND circuit 13 is an L level, and becomes an OFF state when the output level is an H level.

A storage unit 80 stores therein the integrated voltage output from the integration unit 73 of the acquisition unit 70. Every time an integrated voltage is output from the integrating circuit 6, the storage unit 80 adds the integrated voltage to the integrated voltages stored so far, until the memory contents thereof are erased, and stores therein a plurality of integrated voltages.

An arithmetic unit 30 obtains a probability density distribution of a parameter (that is, a normal discharge parameter) acquired by the acquisition unit 70. For example, the arithmetic unit 30 classifies each of the integrated voltages stored in the storage unit 80 (see FIG. 4A) into any of a plurality of value sections to obtain a frequency for each of the value sections. The arithmetic unit 30 then creates a histogram of the value sections (see FIG. 6A), for example, fits a normal distribution to the integrated voltage on the created histogram, and obtains the fitted normal distribution as the probability density distribution of the integrated voltage (see FIG. 4B). That is, the arithmetic unit 30 obtains the probability density distribution of the normal electrical discharge. The arithmetic unit 30 erases memory contents in the storage unit 80, for example, after obtaining the probability density distribution of the integrated voltage.

A decision unit 40 decides a threshold Vref that specifies a boundary between the normal electrical discharge and the abnormal electrical discharge between the poles based on the obtained probability density distribution. The decision unit 40 includes a candidate decision unit 41, a comparison unit 42, and a threshold decision unit 43.

The candidate decision unit 41 decides a candidate threshold VrefNew, which becomes a candidate for the threshold Vref that specifies the boundary between the normal electrical discharge and the abnormal electrical discharge between the poles, based on the obtained probability density distribution. That is, the candidate decision unit 41 statistically estimates a threshold that specifies the boundary between the normal electrical discharge and the abnormal electrical discharge based on the probability density distribution of the normal electrical discharge, and designates the estimated threshold as the candidate threshold VrefNew. The candidate decision unit 41 supplies the decided candidate threshold VrefNew to the comparison unit 42.

The comparison unit 42 receives the candidate threshold VrefNew from the candidate decision unit 41. Furthermore, the comparison unit 42 accesses the threshold decision unit 43, to acquire a threshold VrefOld decided immediately before from the threshold decision unit 43. The comparison unit 42 compares the candidate threshold VrefNew with the threshold VrefOld decided immediately before, and supplies a comparison result to the threshold decision unit 43.

The threshold decision unit 43 decides the threshold Vref that specifies the boundary between the normal electrical discharge and the abnormal electrical discharge between the poles according to the comparison result obtained by the comparison unit 42. That is, when it is determined that a difference between the candidate threshold VrefNew and the threshold VrefOld decided immediately before deviates from an allowable range based on the comparison result obtained by the comparison unit 42, the threshold decision unit 43 decides the candidate threshold VrefNew as the threshold Vref instead of the threshold VrefOld decided immediately before. When it is determined that the difference between the candidate threshold VrefNew and the threshold VrefOld decided immediately before falls within the allowable range based on the comparison result obtained by the comparison unit 42, the threshold decision unit 43 decides the threshold VrefOld decided immediately before as the threshold Vref. The threshold decision unit 43 holds the decided threshold Vref.

A discrimination unit 50 discriminates whether the electrical discharge state between the poles is normal or abnormal by using the threshold Vref decided by the decision unit 40. The discrimination unit 50 includes a comparator 8 and a discharge pulse diagnosis device 23.

The comparator 8 is applied with the integrated voltage from the integrating circuit 6 and acquires the threshold Vref from the threshold decision unit 43. The comparator 8 compares the integrated voltage with the threshold Vref, and supplies a comparison result to the discharge pulse diagnosis device 23. For example, when the integrated voltage exceeds the threshold Vref, the comparator 8 outputs an H level (for example, indicating an abnormal electrical discharge). When the integrated voltage does not exceed the threshold Vref, the comparator 8 outputs an L level (for example, indicating a normal electrical discharge). The discharge pulse diagnosis device 23 uses the comparison result obtained by the comparator 8 to discriminate whether the electrical discharge state between the poles is normal or abnormal. Details of the operation of the discharge pulse diagnosis device 23 are described later.

A discharge voltage detecting device 9 detects a discharge voltage when a machining discharge occurs between the poles and outputs the discharge voltage to an AND circuit 11. A discharge current detecting device 10 detects a discharge current when the machining discharge occurs between the poles and outputs the discharge current to the AND circuit 11 by performing current-voltage conversion. For a period of time in which both the inputs are at the H level, the AND circuit 11 sets the output level to the L level. The output of the AND circuit 11 is input to a time constant measuring device 12 and to the AND circuit 13.

The time constant measuring device 12 is a delaying circuit that delays the timing at which the output of the AND circuit 11 falls from the H level to the L level by an amount of time equivalent to a time constant of the high-pass filter 4 and then outputs the delayed timing to the AND circuit 13. For a period of time in which both the inputs are at the L level, the AND circuit 13 sets the output level to the L level.

A machining voltage level detecting device 20 detects the discharge voltage level when the machining discharge occurs between the poles and supplies the detected discharge voltage level to a comparator 21. The machining voltage level detecting device 20 and the discharge voltage detecting device 9 can be communalized.

A reference value Vc is preset in a reference value setting device 15.

The comparator 21 receives the discharge voltage level from the machining voltage level detecting device 20 and acquires the reference value Vc from the reference value setting device 15. The comparator 21 compares the discharge voltage level with the reference value Vc, and supplies a comparison result to a discharge pulse control device 22 and the discharge pulse diagnosis device 23. For example, when the integrated voltage exceeds the reference value Vc, the comparator 21 outputs an H level (for example, indicating the abnormal electrical discharge). When the integrated voltage does not exceed the reference value Vc, the comparator 8 outputs an L level (for example, indicating the normal electrical discharge).

At the end of the ordinary electrical discharge period in the corresponding electrical discharge machining, the discharge pulse diagnosis device 23 in the discrimination unit 50 performs diagnosis for determining whether the discharge pulse being generated between the poles is a normal electrical discharge pulse (a normal pulse) or an abnormal electrical discharge pulse (a faulty pulse) based on the comparison result of the comparator 8 and the comparison result of the comparator 21.

Specifically, when the output level from the comparator 21 is at the L level and when the output level from the comparator 8 is at the L level, the discharge pulse diagnosis device 23 determines that the discharge pulse is a normal pulse. In a comparison, when the output level from the comparator 21 is at the H level or when the output level from the comparator 21 is at the L level but the output level from the comparator 8 is at the H level, the discharge pulse diagnosis device 23 determines that the discharge pulse is a faulty pulse.

At the end of the ordinary electrical discharge period in the corresponding electrical discharge machining, the discharge pulse diagnosis device 23 performs diagnosis for determining whether the discharge pulse being produced in the machining gap is a normal discharge pulse (normal pulse) or an abnormal discharge pulse (faulty pulse) based on the comparison result of the high-frequency component comparator 8 and the comparison result of the voltage level comparator 21.

The control unit 60 controls machining conditions set by the electrical discharge machine EDM based on the discrimination result of the discrimination unit 50. Specifically, the control unit 60 includes the first pulse counter 24, the second pulse counter 25, a quiescent pulse control device 26, and the discharge pulse control device 22.

An output terminal of the first pulse counter 24 is connected to the quiescent pulse control device 26 and to the reset input terminal of the own counter. Similarly, an output terminal of the second pulse counter 26 is connected to the quiescent pulse control device 26 and to the reset reset input terminal of the own counter.

The first pulse counter 24 counts the normality determination pulse 27a input from the discharge pulse diagnosis device 23 and outputs the count value sequentially to the quiescent pulse control device 26. If the discharge pulse diagnosis device 23 outputs the fault determination pulse 27b during the counting operation, then the count is reset at that point of time. When the normality determination pulse 27a is counted for M number of times in succession, the first pulse counter 24 outputs the count value M to the quiescent pulse control device 26 and resets the own counter.

The second pulse counter 25 counts the fault determination pulse 27b input from the discharge pulse diagnosis device 23 and outputs the count value sequentially to the quiescent pulse control device 26. If the discharge pulse diagnosis device 23 outputs the normality determination pulse 27a during the counting operation, then the count is reset at that point of time. When the fault determination pulse 27b is counted for L number of times in succession, the second pulse counter 25 outputs the count value L to the quiescent pulse control device 26 and resets the own counter.

Based on whether the count value of the first pulse counter is equal to M and whether the count value of the second pulse counter is equal to L, the quiescent pulse control device 26 performs setting control of optimal quiescent period, generates a quiescent pulse 28 having the pulse width equal to the set quiescent period, and outputs the quiescent pulse 28 to the discharge pulse control device 22.

The discharge pulse control device 22 monitors the output level of the comparator 21 for any variation during the ordinary electrical discharge period in the corresponding electrical discharge machining and, if the output level of the comparator 21 remains stable at the L level during the ordinary electrical discharge period, determines that a normal electrical discharge is occurring. In this case, the discharge pulse control device 22 controls the application of voltage with respect to the machining power source 1 in order to cause repeated generation of the discharge pulse having a predetermined discharge voltage/pulse width between the poles with a predetermined quiescent period secured in between the repeated generation.

Moreover, the discharge pulse control device 22 monitors the output level of the comparator 21 for any variation during the ordinary electrical discharge period in the corresponding electrical discharge machining and, if the output level of the comparator 21 rises from the L level to the H level during the ordinary electrical discharge period, determines that an abnormal electrical discharge has occurred after a normal electrical discharge during the ordinary electrical discharge period. In this case, with respect to the machining power source 1, the discharge pulse control device 22 performs control so that the pulse width of the discharge pulse being generated between the poles is cut off at the normal electrical discharge duration and the discharge pulse having the reduced pulse width is repeatedly generated with a predetermined quiescent period, which is indicated by the quiescent pulse 28 input from the quiescent pulse control device 26, secured in between the repeated generation.

The machining conditions to be controlled by the control unit 60 based on the discrimination result of the discrimination unit 50 are not limited to the quiescent time mentioned above, and for example, the machining conditions can include at least one of peak current value, pulse width, quiescent time, jump-down time, jump-up distance, and machining depth. Alternatively, at least two of these can be controlled in parallel by the control unit 60.

Figure 3:
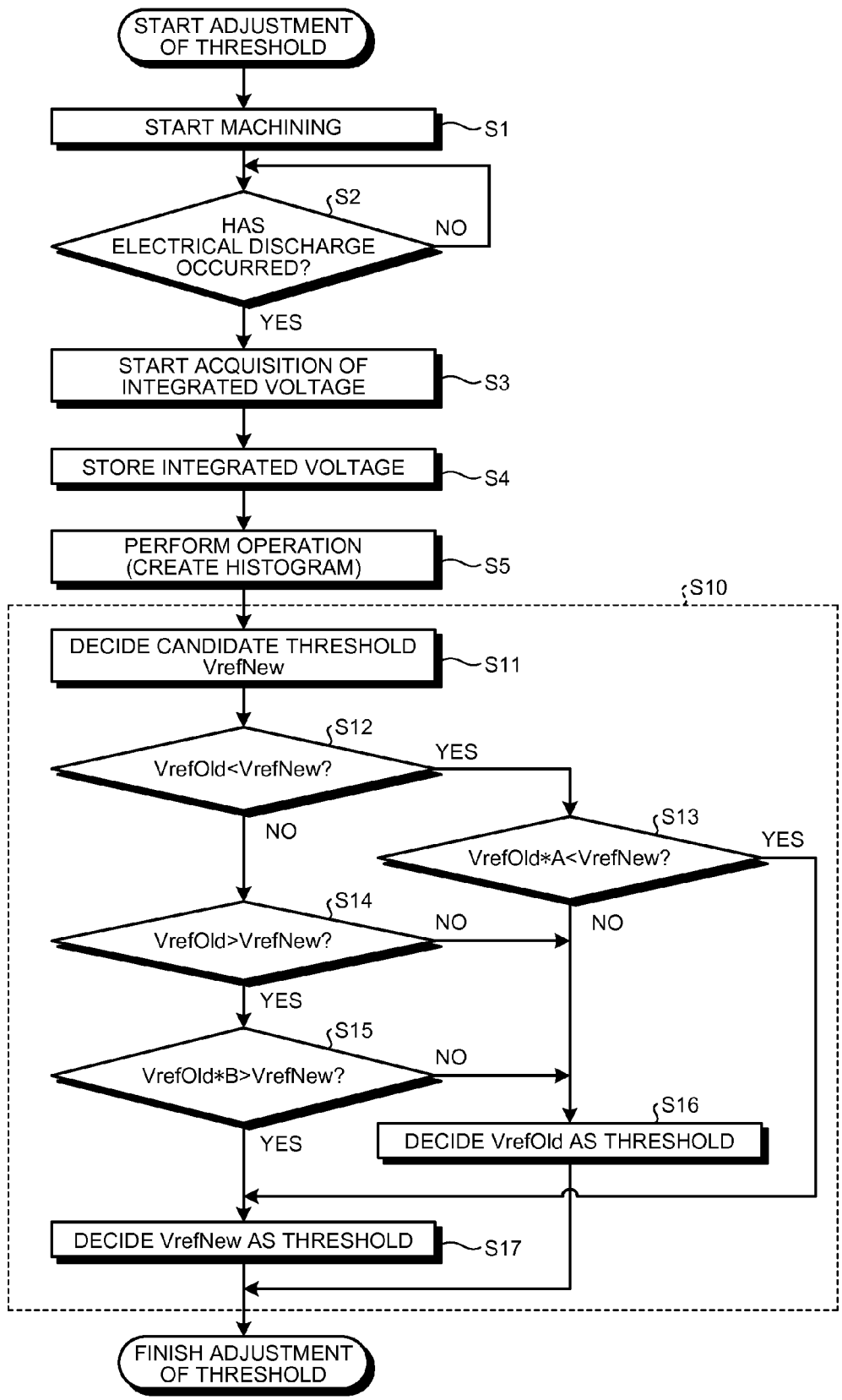
FIG. 3 is a flowchart of an operation of the controller of the electrical discharge machine according to the first embodiment.

An operation of the controller 100 of the electrical discharge machine EDM is explained next with reference to FIG. 3. FIG. 3 is a flowchart of an operation of the controller 100 of the electrical discharge machine EDM.

At Step S1, the control unit 60 generates an electrical discharge between the poles of the electrical discharge machine EDM in a state where machining conditions are controlled so that a normal electrical discharge occurs between the poles. For example, the control unit 60 can use a machining condition, under which a normal electrical discharge has been generated immediately before, as the machining condition under which a normal electrical discharge occurs between the poles.

At Step S2, the control unit 60 determines whether an electrical discharge has occurred between the poles. For example, the control unit 60 detects a discharge voltage between the poles via the voltage detection unit 71, and determines whether an electrical discharge has occurred between the poles based on the detection result. When an electrical discharge has occurred between the poles, the control unit 60 proceeds to Step S3. When an electrical discharge has not occurred between the poles, the control unit 60 proceeds to Step S2.

At Step S3, the acquisition unit 70 starts acquisition of an integrated voltage as a parameter indicating the electrical discharge state between the poles, under the control of the control unit 60. That is, the acquisition unit 70 starts a series of operations as described below. The voltage detection unit 71 detects a discharge voltage between the poles (see FIG. 2A). The extraction unit 72 extracts a high-frequency component of the detected discharge voltage (see FIGS. 2B to 2D). The integration unit 73 integrates the high-frequency component of the extracted discharge voltage, and outputs an integrated voltage to the comparator 8 and the storage unit 80 as a parameter indicating the electrical discharge state between the poles.

At Step S4, the storage unit 80 stores therein the integrated voltage acquired by the acquisition unit 70 under control of the control unit 60. Every time an integrated voltage is output from the integrating circuit 6, the storage unit 80 adds the integrated voltage to the integrated voltages stored so far, until the memory contents thereof are erased, and stores therein a plurality of integrated voltages.

At Step S5, the arithmetic unit 30 obtains a probability density distribution of the parameter acquired by the acquisition unit 70 under the control of the control unit 60. For example, the arithmetic unit 30 classifies each of the integrated voltages stored in the storage unit 80 into any of a plurality of value sections to obtain a frequency for each of the value sections. The arithmetic unit 30 creates a histogram of the value sections (see FIG. 6A), for example, fits a normal distribution to the created histogram, and obtains the fitted normal distribution as the probability density distribution of the integrated voltage (see FIG. 4B).

The parameter acquired by the acquisition unit 70 is acquired in a state where machining conditions are controlled by the control unit 60 so that a normal electrical discharge occurs between the poles. Therefore, it is a parameter of a normal electrical discharge, which hardly includes an abnormal electrical discharge (see FIG. 4A). Accordingly, the probability density distribution obtained by the arithmetic unit 30 is a probability density distribution of a normal electrical discharge, which does not include any abnormal electrical discharge (see FIG. 4B).

The arithmetic unit 30 can erase memory contents of the storage unit 80, for example, after obtaining the probability density distribution of the integrated voltage.

At Step S10, the decision unit 40 decides the threshold Vref that specifies the boundary between the normal electrical discharge and the abnormal electrical discharge between the poles based on the obtained probability density distribution. Specifically, the decision unit 40 performs processes at Steps S11 to S17.

At Step S11, the candidate decision unit 41 decides the candidate threshold VrefNew, which becomes a candidate for the threshold Vref that specifies the boundary between the normal electrical discharge and the abnormal electrical discharge between the poles, based on the obtained probability density distribution. That is, the candidate decision unit 41 statistically estimates a threshold that specifies the boundary between the normal electrical discharge and the abnormal electrical discharge based on the probability density distribution of the normal electrical discharge, and designates the estimated threshold as the candidate threshold VrefNew.

Figure 4B:
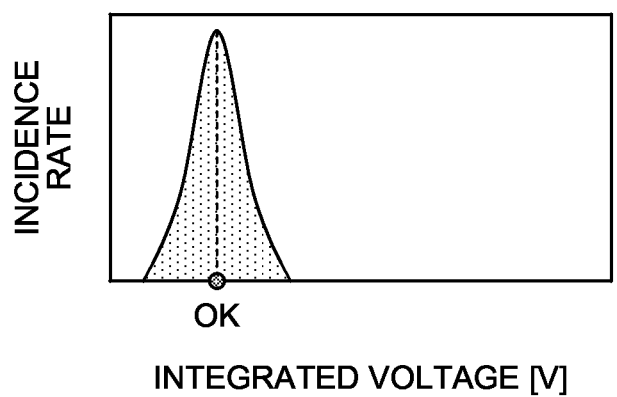

The probability density distribution obtained by the arithmetic unit 30 is a probability density distribution of the normal electrical discharge that does not include any probability density distribution of an abnormal electrical discharge (see FIG. 4B). The candidate decision unit 41 statistically obtains a position at the bottom on the side of (predicted to be) the abnormal electrical discharge, in the probability density distribution of the normal electrical discharge, and estimates an integrated voltage value corresponding to the position as the threshold Vref that specifies the boundary between the normal electrical discharge and the abnormal electrical discharge between the poles.

Figure 6A:
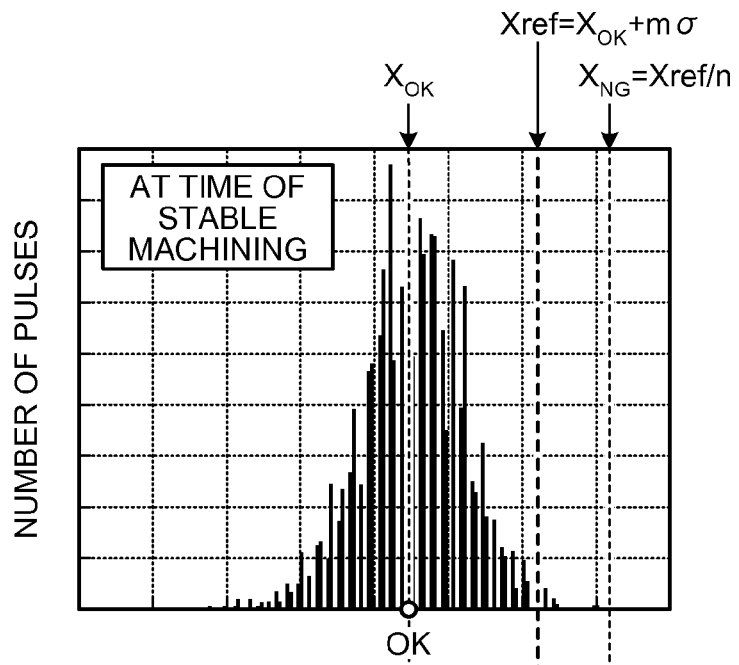
FIGS. 6A and 6B are diagrams for explaining an operation of a decision unit according to the first embodiment.

For example, as shown in FIG. 6A, a position at the bottom on a higher value side in the probability density distribution of the integrated voltage is statistically obtained, designating an integrated voltage $X_{OK}$ corresponding to a peak in the probability density distribution of the integrated voltage (see FIG. 4B) as a reference, to decide an integrated voltage value Xref corresponding to the obtained position at the bottom by using, for example, the following expression 1.

$$Xref = X_{OK} + m\sigma \qquad \text{Expression 1}$$

In the expression 1, σ denotes a standard deviation, and m denotes a constant equal to or larger than 1 and equal to or smaller than 3. The candidate decision unit 41 designates the integrated voltage value Xref decided by using the expression 1 as the candidate threshold VrefNew.

The candidate decision unit 41 then supplies the decided candidate threshold VrefNew to the comparison unit 42.

At Step S12, the comparison unit 42 receives the candidate threshold VrefNew from the candidate decision unit 41. Furthermore, the comparison unit 42 accesses the threshold decision unit 43 to acquire the threshold VrefOld decided immediately before from the threshold decision unit 43. The comparison unit 42 compares the candidate threshold VrefNew with the threshold VrefOld decided immediately before and supplies a comparison result to the threshold decision unit 43. The threshold decision unit 43 determines whether the candidate threshold VrefNew is larger than the threshold VrefOld decided immediately before based on the comparison result acquired from the comparison unit 42.

When the candidate threshold VrefNew is larger than the threshold VrefOld decided immediately before (YES at Step S12), the threshold decision unit 43 proceeds to Step S13. When the candidate threshold VrefNew is equal to or smaller than the threshold VrefOld decided immediately before (NO at Step S12), the threshold decision unit 43 proceeds to Step S14.

At Step S13, the threshold decision unit 43 compares a value VrefOld*A obtained by multiplying the threshold VrefOld decided immediately before by a constant A larger than 1 with the candidate threshold VrefNew, to determine whether the candidate threshold VrefNew is larger than the value VrefOld*A. A is a constant for determining whether the candidate threshold VrefNew largely deviates to a higher value side with respect to the threshold VrefOld decided immediately before, and is 1.1, for example.

When the candidate threshold VrefNew is larger than the value VrefOld*A (YES at Step S13), the threshold decision unit 43 decides that the candidate threshold VrefNew largely deviates to the higher value side with respect to the threshold VrefOld decided immediately before, and proceeds to Step S17. When the candidate threshold VrefNew is equal to or smaller than the value VrefOld*A (NO at Step S13), the threshold decision unit 43 decides that the candidate threshold VrefNew does not largely deviate to the higher value side with respect to the threshold VrefOld decided immediately before, and proceeds to Step S16.

At Step S14, the threshold decision unit 43 determines whether the candidate threshold VrefNew is smaller than the threshold VrefOld decided immediately before based on the comparison result obtained by the comparison unit 42. When the candidate threshold VrefNew is smaller than the threshold VrefOld decided immediately before (YES at Step S14), the threshold decision unit 43 proceeds to Step S15. When the candidate threshold VrefNew is equal to or larger than the threshold VrefOld decided immediately before (NO at Step S14), the threshold decision unit 43 determines that the candidate threshold VrefNew is equal to the threshold VrefOld decided immediately before and proceeds to Step S16.

At Step S15, the threshold decision unit 43 compares a value VrefOld*B obtained by multiplying the threshold VrefOld decided immediately before by a positive constant B smaller than 1 with the candidate threshold VrefNew, to determine whether the candidate threshold VrefNew is smaller than the value VrefOld*B. B is a constant for determining whether the candidate threshold VrefNew largely deviates to a lower value side with respect to the threshold VrefOld decided immediately before, and is 0.9, for example.

When the candidate threshold VrefNew is smaller than the value VrefOld*B (YES at Step S15), the threshold decision unit 43 decides that the candidate threshold VrefNew largely deviates to the lower value side with respect to the threshold VrefOld decided immediately before, and proceeds to Step S17. When the candidate threshold VrefNew is equal to or larger than the value VrefOld*B (NO at Step S15), the threshold decision unit 43 decides that the candidate threshold VrefNew does not largely deviate to the lower value side with respect to the threshold VrefOld decided immediately before, and proceeds to Step S16.

At Step S16, the threshold decision unit 43 determines that a difference between the candidate threshold VrefNew and the threshold VrefOld decided immediately before falls within an allowable range, and decides the threshold VrefOld decided immediately before as the threshold Vref. The threshold decision unit 43 holds the decided threshold Vref.

At Step S17, the threshold decision unit 43 determines that the difference between the candidate threshold VrefNew and the threshold VrefOld decided immediately before deviates from the allowable range, and decides the candidate threshold VrefNew as the threshold Vref instead of the threshold VrefOld decided immediately before. The threshold decision unit 43 holds the decided threshold Vref.

There is considered a case where an operator reads a value of an output of the integrating circuit 6 measured by a measuring instrument and inputs the value and to the controller 100, while actually machining the workpiece 3 by an electrical discharge machine EDM, thereby setting the threshold Vref to be used by the comparator 8. In this case, preparation and adjustment of the measuring instrument take time, and variation in the threshold depending on an operator tends to occur. Accordingly, the threshold to be set may deviate from an appropriate value, and it is likely to become difficult to accurately discriminate whether the electrical discharge state between the poles is normal or abnormal.

On the other hand, in the first embodiment, the acquisition unit 70 acquires a parameter indicating the electrical discharge state between the poles, the arithmetic unit 30 obtains a probability density distribution of the acquired parameter, and the decision unit 40 decides the threshold Vref that specifies a boundary between the normal electrical discharge and the abnormal electrical discharge between the poles based on the obtained probability density distribution. Accordingly, preparation and adjustment of the measuring instrument are not required, and an influence of variation depending on an operator in deciding the threshold can be eliminated, thereby enabling to accurately discriminate the electrical discharge state between the poles, while actually machining the workpiece 3 by the electrical discharge machine EDM.

Alternatively, there is considered a case where the controller 100 uses a certain threshold preset before shipment to discriminate the electrical discharge state between poles, while actually machining the workpiece 3 by the electrical discharge machine EDM. In this case, because the threshold remains fixed at a certain value preset before shipment, the set threshold is likely to deviate from an appropriate value due to a factor that is difficult to be assumed before shipment, such as an influence of a capacitance attributable to a machining area and a variation in the threshold every moment according to a machining shape and a progress status of machining. Accordingly, it is likely to become difficult to accurately discriminate whether the electrical discharge state between the poles is normal or abnormal.

On the other hand, in the first embodiment, a threshold for discriminating the electrical discharge state between the poles is not maintained at a certain value, and the decision unit 40 decides the threshold Vref that specifies a boundary between the normal electrical discharge and the abnormal electrical discharge between the poles based on the probability density distribution obtained beforehand. Accordingly, the threshold for discriminating the electrical discharge state between the poles can be dynamically adjusted corresponding to a change in the electrical discharge state between the poles. Therefore, if an appropriate value as the threshold has changed due to a factor that is difficult to be assumed before shipment, the threshold can be dynamically adjusted to approach the appropriate value. Accordingly, even if the appropriate value as the threshold changes due to a factor that is difficult to be assumed before shipment, the electrical discharge state between the poles can be accurately discriminated, while actually machining the workpiece 3 by the electrical discharge machine EDM.

Figure 5A:
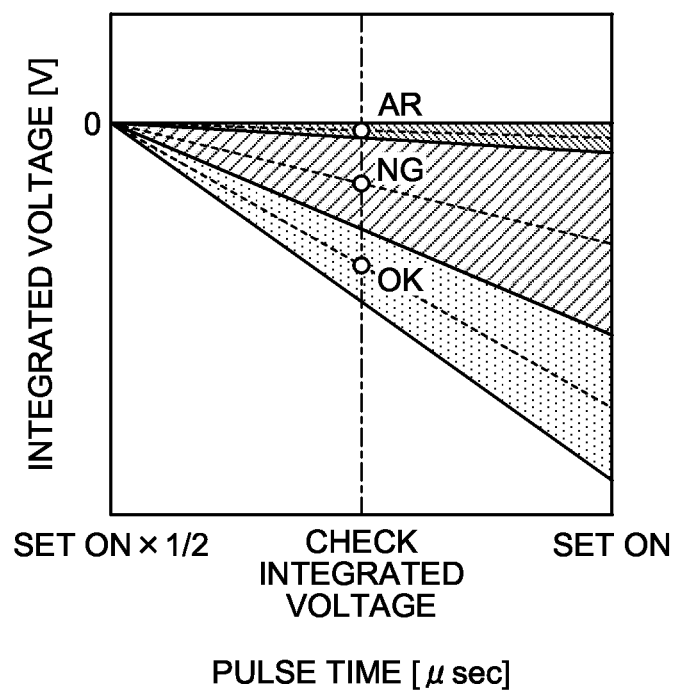
FIGS. 5A and 5B are diagrams for explaining an operation of the arithmetic unit according to the first embodiment.
Figure 5B:
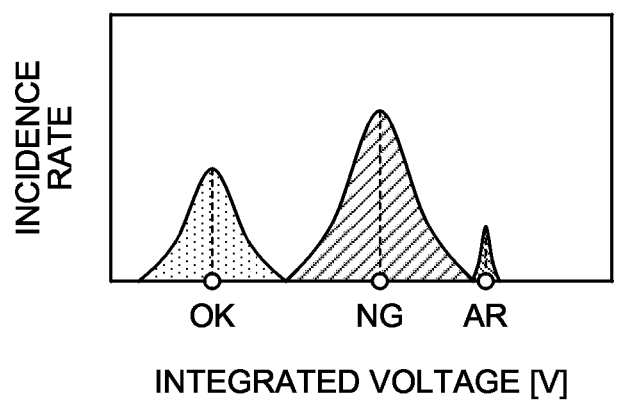
Figure 6B:
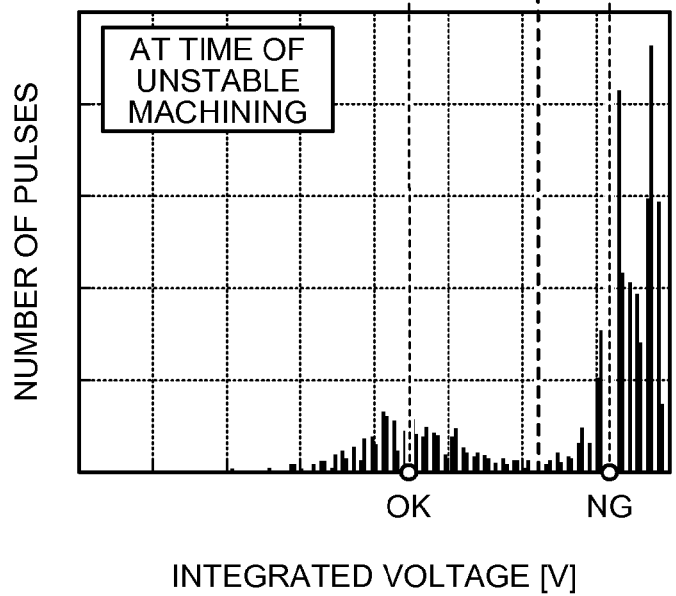

Alternatively, there is considered a case where the control unit 60 decides a threshold for discriminating the electrical discharge state between the poles by using an integrated voltage from the integrating circuit 6 acquired by controlling the electrical discharge state between the poles in a state including many abnormal electrical discharges by the control unit 60, while actually machining the workpiece 3 by the electrical discharge machine EDM. In this case, the storage unit 80 stores therein an output of the integrating circuit 6 as required, the arithmetic unit 30 creates a histogram (see FIG. 6A) for a plurality of integrated voltages (see FIG. 5A) stored in the storage unit 80, recognizes a plurality of peaks in the distribution from the created histogram to perform fitting by using, for example, a normal distribution for each peak in the distribution, thereby obtaining each of the fitted normal distributions, respectively, as a probability density distribution of a normal electrical discharge (OK), an abnormal electrical discharge (NG), and an arc electrical discharge (AR) (see FIG. 5B). At this time, as shown in FIG. 6B, a boundary between a distribution of the normal electrical discharge (OK) and a distribution of the abnormal electrical discharge (NG) can be recognized, thereby enabling to obtain the threshold Xref that specifies a boundary between the normal electrical discharge and the abnormal electrical discharge.

However, when the workpiece 3 is actually machined by the electrical discharge machine EDM, if the electrical discharge state between the poles is set to a state including many abnormal electrical discharges, machining of the workpiece 3 is likely to fail, and the workpiece 3 may become useless as a product.

On the other hand, in the first embodiment, the acquisition unit 70 acquires a parameter indicating the electrical discharge state between the poles in a state where machining conditions are controlled by the control unit 60 so that the normal electrical discharge occurs between the poles. The arithmetic unit 30 obtains a probability density distribution of the acquired parameter at the time of the normal electrical discharge, and the decision unit 40 statistically estimates and decides a threshold that specifies the boundary between the normal electrical discharge and the abnormal electrical discharge between the poles, based on the obtained probability density distribution of the normal electrical discharge. Accordingly, the threshold that specifies the boundary between the normal electrical discharge and the abnormal electrical discharge between the poles can be decided, while maintaining the state where the normal electrical discharge occurs between the poles, thereby enabling to reduce a machining failure of the workpiece 3, and a machining yield at the time of using the workpiece 3 as a product can be improved.

In the first embodiment, in the decision unit 40, the candidate decision unit 41 decides the candidate threshold VrefNew, which becomes a candidate for a threshold that specifies a boundary between the normal electrical discharge and the abnormal electrical discharge between the poles, based on the obtained probability density distribution. The comparison unit 42 compares the candidate threshold VrefNew with the threshold VrefOld decided immediately before. When a difference between the candidate threshold VrefNew and the threshold VrefOld decided immediately before deviates from an allowable range, the threshold decision unit 43 decides the candidate threshold VrefNew as the threshold Vref instead of the threshold VrefOld decided immediately before. When the difference between the candidate threshold VrefNew and the threshold VrefOld decided immediately before falls within the allowable range, the threshold decision unit 43 decides the threshold VrefOld decided immediately before as the threshold Vref. Accordingly, a dead zone can be provided for an adjustment operation of the threshold performed by the decision unit 40, thereby enabling to stabilize the adjustment operation of the threshold performed by the decision unit 40.

Furthermore, in the first embodiment, the arithmetic unit 30 obtains a histogram of the acquired parameter at the time of a normal electrical discharge, and a normal distribution is fitted to the obtained histogram, thereby obtaining the fitted normal distribution as a probability density distribution. At this time, because the obtained probability density distribution is a normal distribution, a position at the bottom corresponding to a threshold that specifies a boundary between the normal electrical discharge and the abnormal electrical discharge can be statistically obtained (see FIGS. 6A and 6B). That is, the candidate decision unit 41 of the decision unit 40 statistically obtains a position at the bottom in the probability density distribution obtained (of the normal electrical discharge), and decides a value corresponding to the obtained position at the bottom as the candidate threshold VrefNew. Accordingly, a threshold that specifies a boundary between the normal electrical discharge and the abnormal electrical discharge can be accurately decided without obtaining a probability density distribution of an abnormal electrical discharge.

Second Embodiment

A controller 100$i$ of the electrical discharge machine EDM according to a second embodiment is explained next. Portions different from those in the first embodiment are mainly explained below.

While the acquisition unit 70 first detects a discharge voltage between poles in the first embodiment, in the second embodiment, an acquisition unit 70$i$ first detects a discharge current between the poles.

Figure 7:
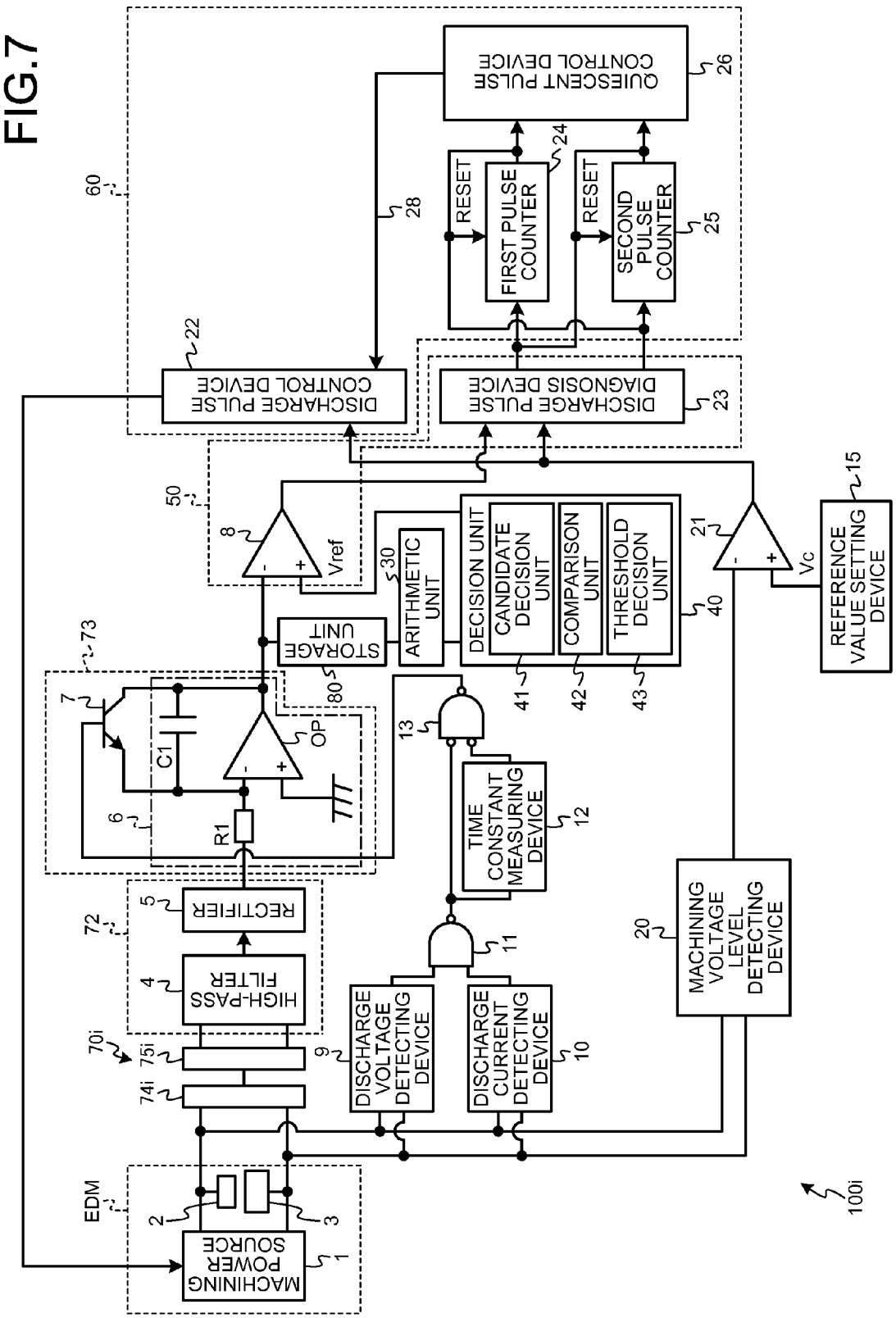
FIG. 7 depicts a configuration of a controller of an electrical discharge machine according to a second embodiment.

Specifically, as shown in FIG. 7, the acquisition unit 70$i$ of the controller 100$i$ includes a current detection unit 74$i$ and a current-voltage conversion unit 75$i$. The current detection unit 74$i$ detects a discharge current between the poles. The current detection unit 74$i$ detects a discharge current between the poles. The current detection unit 74$i$ receives, for example, a differential signal from opposite ends between the poles by two input terminals and outputs a current corresponding to the input differential signal from one output terminal as a detected discharge current.

The current-voltage conversion unit 75$i$ converts the detected discharge current to a voltage. The current-voltage conversion unit 75$i$ receives, for example, the current output from the current detection unit 74$i$ by one input terminal, converts the input signal to a voltage by a resistance or a transformer, and outputs a differential signal (for example, a differential voltage) corresponding to the converted voltage to the extraction unit 72 from two output terminals as a converted voltage.

As described above, also in the second embodiment, the acquisition unit 70$i$ can acquire a parameter indicating the electrical discharge state between the poles.

Third Embodiment

A controller 100$j$ of the electrical discharge machine EDM according to a third embodiment is explained next. Portions different from those in the first embodiment are mainly explained below.

While adjustment of a threshold by the decision unit 40 is constantly performed in the first embodiment, in the third embodiment, adjustment of the threshold by the decision unit 40 is performed in response to an instruction from a user.

Figure 8:
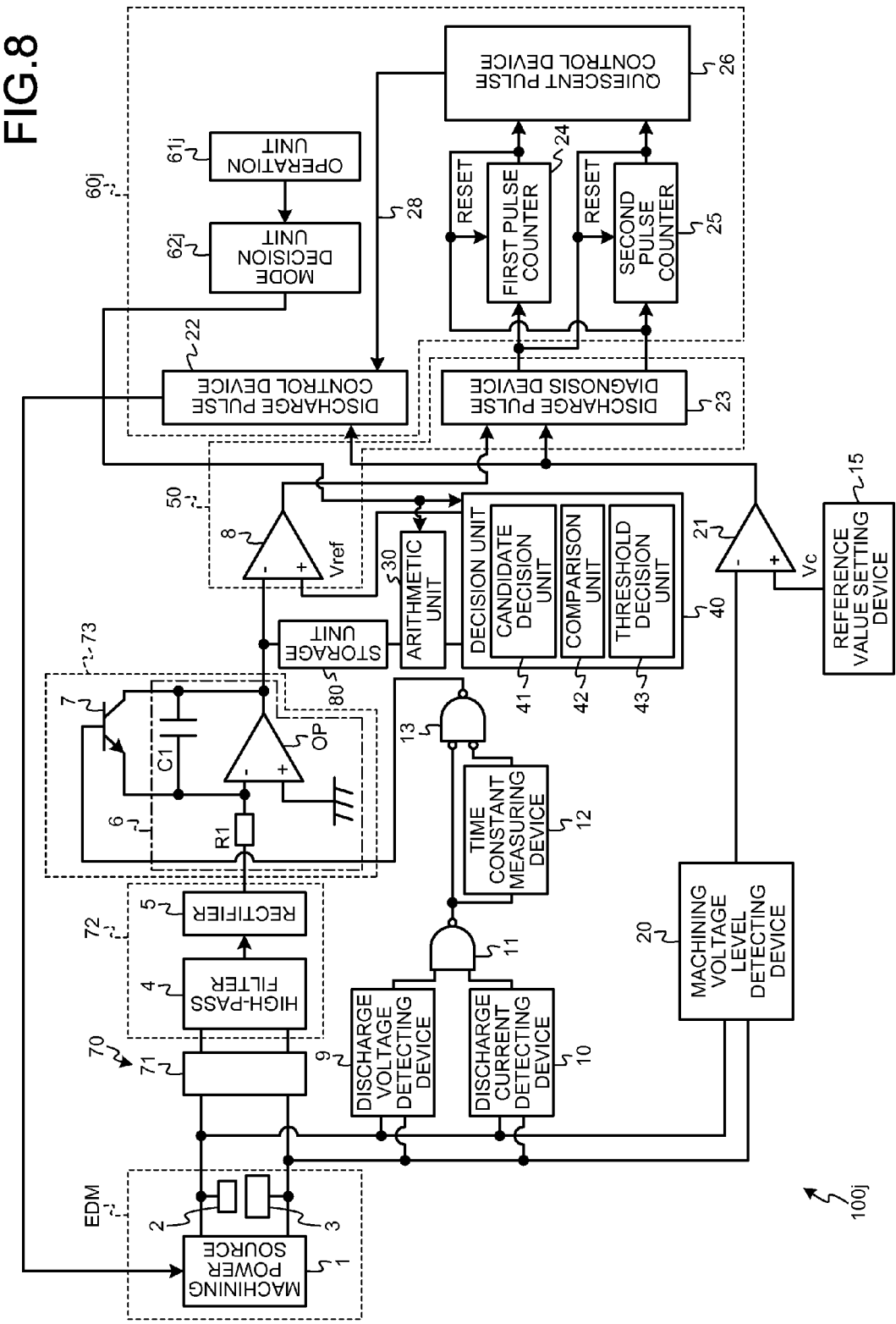
FIG. 8 depicts a configuration of a controller of an electrical discharge machine according to a third embodiment.

Specifically, as shown in FIG. 8, a control unit 60$j$ in the controller 100$j$ includes an operation unit 61$j$ and a mode decision unit 62$j$. The controller 100$j$ has, for example, a mode A in which adjustment of a threshold is not performed and a mode B in which adjustment of the threshold is performed, as operating modes. The mode decision unit 62$j$ has the operating mode of the controller 100$j$ decided to the mode A in an initial state, thereby stopping an operation of the arithmetic unit 30 and the decision unit 40. Accordingly, in the initial state, adjustment of the threshold by the decision unit 40 is not performed. Upon reception of an instruction to perform adjustment of the threshold from the user via the operation unit 61$j$, the mode decision unit 62$j$ changes the operating mode of the controller 100$j$ from the mode A to the mode B and decides the operating mode as the mode B. The mode decision unit 62$j$ then causes the arithmetic unit 30 and the decision unit 40 to operate according to the decision as the mode B. Accordingly, adjustment of the threshold by the decision unit 40 can be performed at a timing corresponding to the instruction from the user.

The mode B for performing adjustment of the threshold can include a first mode in which machining stability is regarded important and a second mode in which machining speed is regarded important. In this case, the operation unit 61$j$ can further receive an instruction to select either the first mode or the second mode, in addition to the instruction to perform adjustment of the threshold.

Figure 9A:
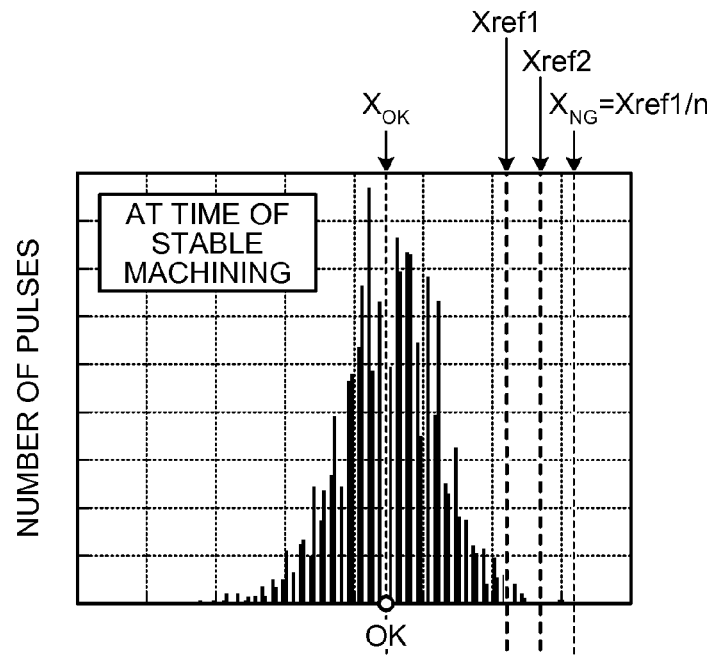
FIGS. 9A and 9B are diagrams for explaining an operation of a decision unit according to the third embodiment.
Figure 9B:
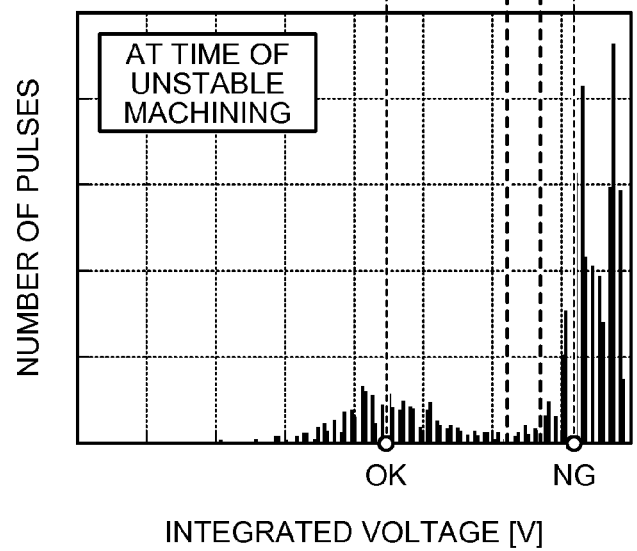
Figure 10:
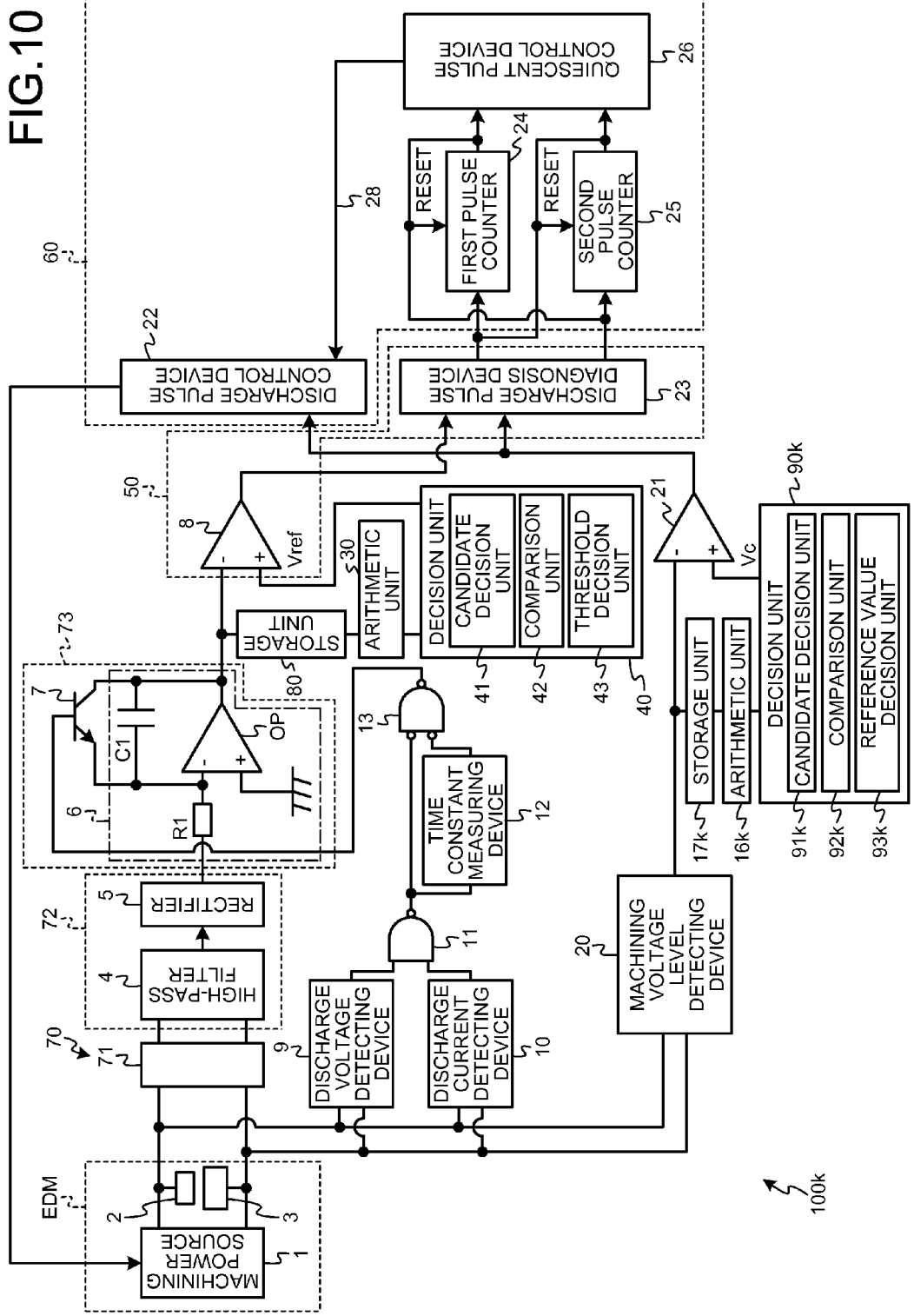
FIG. 10 depicts a configuration of a controller of an electrical discharge machine according to a fourth embodiment.

For example, upon reception of an instruction to select the first mode from the user via the operation unit 61$j$, the mode decision unit 62$j$ changes the operating mode of the controller 100$j$ to the first mode in the mode B and decides the operating mode as the first mode, to control the operation of the arithmetic unit 30 and the decision unit 40 according to the decision as the first mode. For example, the candidate decision unit 41 of the decision unit 40 statistically obtains a position at the bottom on a higher value side in the probability density distribution of the integrated voltage, using the integrated voltage $X_{OK}$ corresponding to the peak in the probability density distribution of the integrated voltage (see FIG. 4($b$)) as a reference, as shown in FIG. 9($a$), under control by the mode decision unit 62$j$, and decides an integrated voltage Xref1 corresponding to the obtained position at the bottom by using, for example, the following expression 2.

$$X\text{ref}1 = X_{OK} + m\sigma \qquad \text{Expression 2}$$

In the expression 2, $\sigma$ denotes a standard deviation, and m denotes a constant (not limited to an integer) equal to or larger than 1 and equal to or smaller than 3. The candidate decision unit 41 designates the integrated voltage value Xref1 decided, for example, by using the expression 2 as the candidate threshold VrefNew.

Alternatively, upon reception of an instruction to select the second mode from the user via the operation unit 61$j$, the mode decision unit 62$j$ changes the operating mode of the controller 100$j$ to the first mode in the mode B and decides the operating mode as the first mode, to control the operation of the arithmetic unit 30 and the decision unit 40 according to the decision as the first mode. For example, the candidate decision unit 41 of the decision unit 40 statistically obtains a position at the bottom on the higher value side in the probability density distribution of the integrated voltage, using the integrated voltage $X_{OK}$ corresponding to the peak in the probability density distribution of the integrated voltage (see FIG. 4($b$)) as a reference, as shown in FIG. 9($a$), under control by the mode decision unit 62$j$, and decides the integrated voltage Xref1 corresponding to the obtained position at the bottom by using, for example, the above expression 2. The candidate decision unit 41 then estimates an integrated voltage $X_{NG}$ corresponding to the peak in the probability density distribution of an abnormal electrical discharge by using the following expression 3.

$$X_{NG} = X\text{ref}1/n \qquad \text{Expression 3}$$

In the expression 3, n denotes a constant (not limited to an integer) equal to or larger than 2 and equal to or smaller than 4. The present inventor(s) has confirmed that the integrated voltage $X_{NG}$ corresponds to the actual peak of the abnormal electrical discharge (see FIG. 9($b$)). The candidate decision unit 41 decides an integrated voltage value Xref2 by using, for example, the following expression 4.

$$X\text{ref}2 = X\text{ref}1 + (X_{NG} - X\text{ref}1) \times k \qquad \text{Expression 4}$$

In the expression 4, k is a constant larger than 0 and smaller than 1. When the expressions 2 and 3 are substituted in the expression 4, the following expression 5 is obtained.

$$Xref2 = X_{OK} + m\sigma + (Xref1/n - Xref1) \times k \quad \text{Expression 5}$$

The candidate decision unit 41 designates the integrated voltage value Xref2 decided by using, for example, the expression 5 as the candidate threshold VrefNew.

As described above, the mode decision unit 62j changes over the operating mode of the controller 100j in response to an instruction from the user, and the decision unit 40 decides a first threshold in the first mode and a second threshold in the second mode based on the obtained probability density distribution. Accordingly, the electrical discharge state between poles can be discriminated so that the electrical discharge machine EDM performs an operation according to a user's intention via a threshold corresponding to the user's intention.

For example, the candidate threshold VrefNew (=Xref2) decided in the second mode in which machining speed is regarded important is a value closer to the peak ($X_{NG}$) of the abnormal electrical discharge than the candidate threshold VrefNew (=Xref1) decided in the first mode in which machining stability is regarded important. That is, in the first mode, the electrical discharge state between the poles can be discriminated so that the electrical discharge machine EDM stably operates, and in the second mode, the electrical discharge state between the poles can be discriminated so that the electrical discharge machine EDM operates at a high speed.

Fourth Embodiment

A controller 100k of the electrical discharge machine EDM according to a fourth embodiment is explained next. Portions different from those in the first embodiment are mainly explained below.

In the first embodiment, the reference value Vc to be used for a comparison with the machining voltage level is preset by the reference value setting device 15 (see FIG. 1). However, in the fourth embodiment, adjustment of the reference value Vc to be used for a comparison with the machining voltage level is also adjusted.

Specifically, the controller 100k does not include the reference value setting device 15, and further includes a storage unit 17k, an arithmetic unit 16k, and a decision unit 90k.

The storage unit 17k stores therein a discharge voltage level output from the machining voltage level detecting device 20. Every time a discharge voltage level is output from the machining voltage level detecting device 20, the storage unit 17k adds a discharge voltage level to the discharge voltage levels stored so far, until the memory contents thereof are erased, and stores therein a plurality of discharge voltage levels.

The arithmetic unit 16k obtains a probability density distribution of a parameter acquired by the acquisition unit 70 (that is, a parameter of a normal electrical discharge). For example, the arithmetic unit 16k classifies each of the discharge voltage levels stored in the storage unit 17k into any of a plurality of value sections to obtain a frequency for each of the value sections. The arithmetic unit 16k creates a histogram of the value sections, to obtain the probability density distribution of the normal electrical discharge with respect to the discharge voltage level based on the created histogram. For example, after having obtained the probability density distribution of the discharge voltage level, the arithmetic unit 16k erases the memory contents of the storage unit 17k.

The decision unit 90k decides a reference value Vc that specifies a boundary between the normal electrical discharge and the abnormal electrical discharge between poles based on the obtained probability density distribution. The decision unit 90k includes a candidate decision unit 91k, a comparison unit 92k, and a reference value decision unit 93k.

The candidate decision unit 91k decides a candidate reference value VcNew, which becomes a candidate for the reference value Vc that specifies the boundary between the normal electrical discharge and the abnormal electrical discharge between the poles, based on the obtained probability density distribution. That is, the candidate decision unit 91k statistically estimates a reference value that specifies the boundary between the normal electrical discharge and the abnormal electrical discharge based on the probability density distribution of the normal electrical discharge, and designates the estimated reference value as the candidate reference value VcNew. The candidate decision unit 91k supplies the decided candidate reference value VcNew to the comparison unit 92k.

The comparison unit 92k receives the candidate reference value VcNew from the candidate decision unit 91k. Furthermore, the comparison unit 92k accesses the reference value decision unit 93k, to acquire a reference value VcOld decided immediately before from the reference value decision unit 93k. The comparison unit 92k compares the candidate reference value VcNew with the reference value VcOld decided immediately before, and supplies a comparison result to the reference value decision unit 93k.

The reference value decision unit 93k decides the reference value Vc that specifies the boundary between the normal electrical discharge and the abnormal electrical discharge between the poles according to the comparison result obtained by the comparison unit 92k. That is, when it is determined that a difference between the candidate reference value VcNew and the reference value VcOld decided immediately before deviates from an allowable range based on the comparison result obtained by the comparison unit 92k, the reference value decision unit 93k decides the candidate reference value VcNew as the reference value Vref instead of the reference value VcOld decided immediately before. When it is determined that the difference between the candidate reference value VcNew and the reference value VcOld decided immediately before falls within the allowable range based on the comparison result obtained by the comparison unit 92k, the reference value decision unit 93k decides the reference value VcOld decided immediately before as the reference value Vref. The reference value decision unit 93k holds the decided reference value Vc.

As described above, in the fourth embodiment, adjustment of the reference value Vc used for the comparison with the machining voltage level can be dynamically performed, in addition to the adjustment of the threshold Vref used for the comparison with an integrated output of high-frequency components of a discharge voltage, in a state where machining conditions are controlled by the control unit 60 so that a normal electrical discharge occurs between the poles. Accordingly, the electrical discharge state between the poles can be discriminated more accurately, while actually machining the workpiece 3 by the electrical discharge machine EDM.

INDUSTRIAL APPLICABILITY

As described above, the controller of an electrical discharge machine according to the present invention is useful for discriminating the electrical discharge state between poles.

EXPLANATIONS OF LETTERS OR NUMERALS 1 machining power source
2 machining electrode
3 workpiece
4 high-pass filter
5 rectifier
6 integrating circuit
7 reset transistor
8 comparator
9 discharge voltage detecting device
10 discharge current detecting device
11 AND circuit
12 time constant measuring device
13 AND circuit
15 reference value setting device
16k arithmetic unit
17k storage unit
20 machining voltage level detecting device
21 comparator
22 discharge pulse control device
23 discharge pulse diagnosis device
24 first pulse counter
25 second pulse counter
26 quiescent pulse control device
30 arithmetic unit
40 decision unit
41 candidate decision unit
42 comparison unit
43 threshold decision unit
50 discrimination unit
60, 60j control unit
61j operation unit
62j mode decision unit
70 acquisition unit
71 voltage detection unit
72 extraction unit
73 integration unit
74i current detection unit
75i current-voltage conversion unit
80 storage unit
90k decision unit
91k candidate decision unit
92k comparison unit
93k reference value decision unit
100, 100i, 100j, 100k controller

The invention claimed is:

1. A controller of an electrical discharge machine for controlling an electrical discharge machine that generates an electrical discharge between poles of an electrode and a workpiece, comprising:
a control unit that controls a machining condition set by the electrical discharge machine;
an acquisition unit that acquires a parameter indicating an electrical discharge state between the poles in a state where the machining condition is controlled by the control unit so that a normal electrical discharge occurs between the poles;
an arithmetic unit that obtains a probability density distribution of the acquired parameter;
a decision unit that decides a threshold that specifies a boundary between a normal electrical discharge and an abnormal electrical discharge between the poles based on the obtained probability density distribution; and
a discrimination unit that discriminates whether the electrical discharge state between the poles is normal or abnormal by using the decided threshold, and
wherein the control unit controls the machining condition set by the electrical discharge machine based on a discrimination result of the discrimination unit.

2. The controller of an electrical discharge machine according to claim 1, wherein the decision unit includes
a candidate decision unit that decides a candidate threshold which becomes a candidate for a threshold that specifies a boundary between the normal electrical discharge and the abnormal electrical discharge between the poles, based on the obtained probability density distribution, and
a threshold decision unit that decides the candidate threshold as the threshold instead of a threshold decided immediately before when a difference between the candidate threshold and the threshold decided immediately before deviates from an allowable range, and decides the threshold decided immediately before as the threshold when the difference between the candidate threshold and the threshold decided immediately before falls within the allowable range.

3. The controller of an electrical discharge machine according to claim 2, wherein
the arithmetic unit obtains a histogram of the acquired parameter, fits a normal distribution to the obtained histogram, and obtains the fitted normal distribution as the probability density distribution, and
the candidate decision unit statistically obtains a position at a bottom in the obtained probability density distribution, and decides a value corresponding to the obtained position at the bottom as the candidate threshold.

4. The controller of an electrical discharge machine according to claim 1, wherein
the acquisition unit includes
a voltage detection unit that detects a discharge voltage between the poles,
an extraction unit that extracts high-frequency components of the detected discharge voltage, and
an integration unit that integrates the extracted high-frequency components of the discharge voltage and outputs an integrated voltage as the parameter.

5. The controller of an electrical discharge machine according to claim 1, wherein
the acquisition unit includes
a current detection unit that detects a discharge current between the poles,
a current-voltage conversion unit that converts the detected discharge current to a voltage,
an extraction unit that extracts high-frequency components of the converted voltage, and
an integration unit that integrates the extracted high-frequency components of the voltage and outputs an integrated voltage as the parameter.

6. The controller of an electrical discharge machine according to claim 1, wherein
the decision unit decides a first threshold in a first mode and decides a second threshold in a second mode based on the obtained probability density distribution.

7. The controller of an electrical discharge machine according to claim 6, wherein
the first mode is a mode in which machining stability is regarded important,
the second mode is a mode in which machining speed is regarded important, and
the second threshold is a value closer to a peak of an abnormal electrical discharge than the first threshold.

* * * * *